United States Patent
McCain

(10) Patent No.: US 7,182,988 B2
(45) Date of Patent: Feb. 27, 2007

(54) CHINKING TAPE FOR LOG STRUCTURES

(76) Inventor: James S. McCain, 13 W. Ranch Rd., Morrison, CO (US) 80465

( * ) Notice: Subject to any disclaimer, the term of this patent is extended or adjusted under 35 U.S.C. 154(b) by 146 days.

(21) Appl. No.: 10/818,637

(22) Filed: Apr. 6, 2004

(65) Prior Publication Data

US 2004/0187412 A1    Sep. 30, 2004

Related U.S. Application Data

(63) Continuation-in-part of application No. 09/971,235, filed on Oct. 3, 2001, now Pat. No. 6,780,485.

(51) Int. Cl.
*B32B 3/00* (2006.01)

(52) U.S. Cl. .................. 428/40.2; 52/233; 52/282.1; 52/283.1; 52/284; 52/286; 428/40.1; 428/42.1; 428/151; 428/354

(58) Field of Classification Search .......... 428/40.1, 428/40.2, 42.1, 151, 354, 906; 52/233, 283.1, 52/284, 286, 282.1
See application file for complete search history.

(56) References Cited

U.S. PATENT DOCUMENTS

| | | | |
|---|---|---|---|
| 4,185,428 A | 1/1980 | Boucquey et al. | |
| 4,205,109 A * | 5/1980 | France et al. | 428/150 |
| 4,356,676 A | 11/1982 | Hauptman | |
| 4,822,655 A | 4/1989 | Foster | |
| 4,918,888 A | 4/1990 | Giles et al. | |
| 5,505,028 A | 4/1996 | Giles | |
| 5,783,303 A * | 7/1998 | Tsuei | 428/354 |
| 5,787,661 A | 8/1998 | Sharp | |
| 6,000,177 A | 12/1999 | Davidson | |
| 6,780,485 B2 * | 8/2004 | McCain | 428/40.1 |

* cited by examiner

*Primary Examiner*—Nasser Ahmad
(74) *Attorney, Agent, or Firm*—Dorr, Carson & Birney, P.C.

(57) ABSTRACT

A pre-textured sealing tape is provided for sealing the chink between the stacked logs in a log structure. A paper, plastic, metal or textile type of backing support material is coated with a thin layer of flexible moisture impermeable material resembling conventional chinking materials. A suitable adhesive can be applied to the opposite side of the support materials with the adhesive covered by a release layer. The tape is cut to the desired width for the chink that is to be sealed and is finished in a rolled configuration. A synthetic resin mixed with a granular material has been found to be suitable for the flexible coating and texturing of the tape. The tape can be applied directly to the logs, between the logs or to objects positioned within the chink, such as splines, insulation sheeting, or plywood panels. The tape can cover the space between simulated logs attached to panels used in simulated log structures.

18 Claims, 6 Drawing Sheets

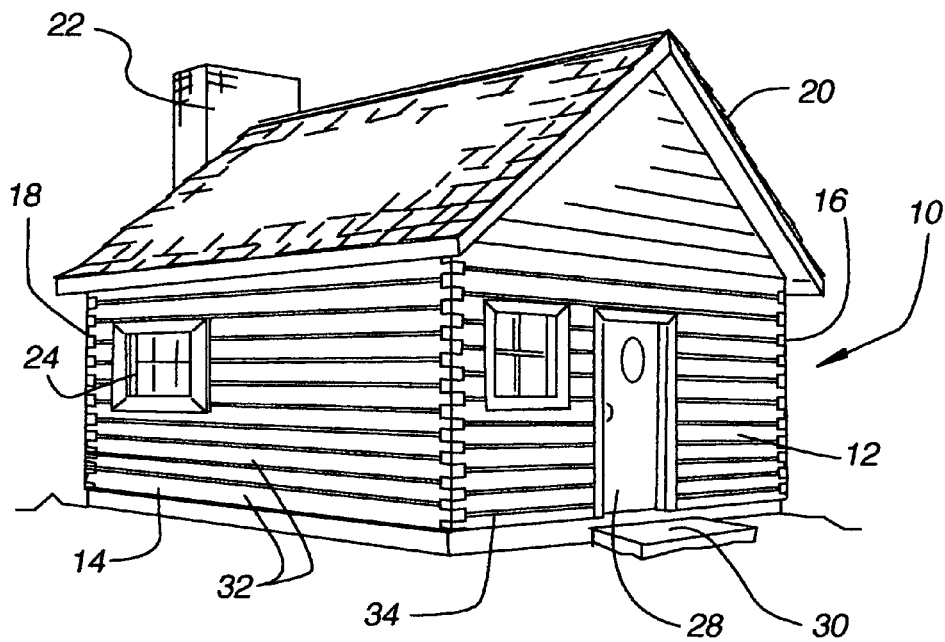
Fig. 1
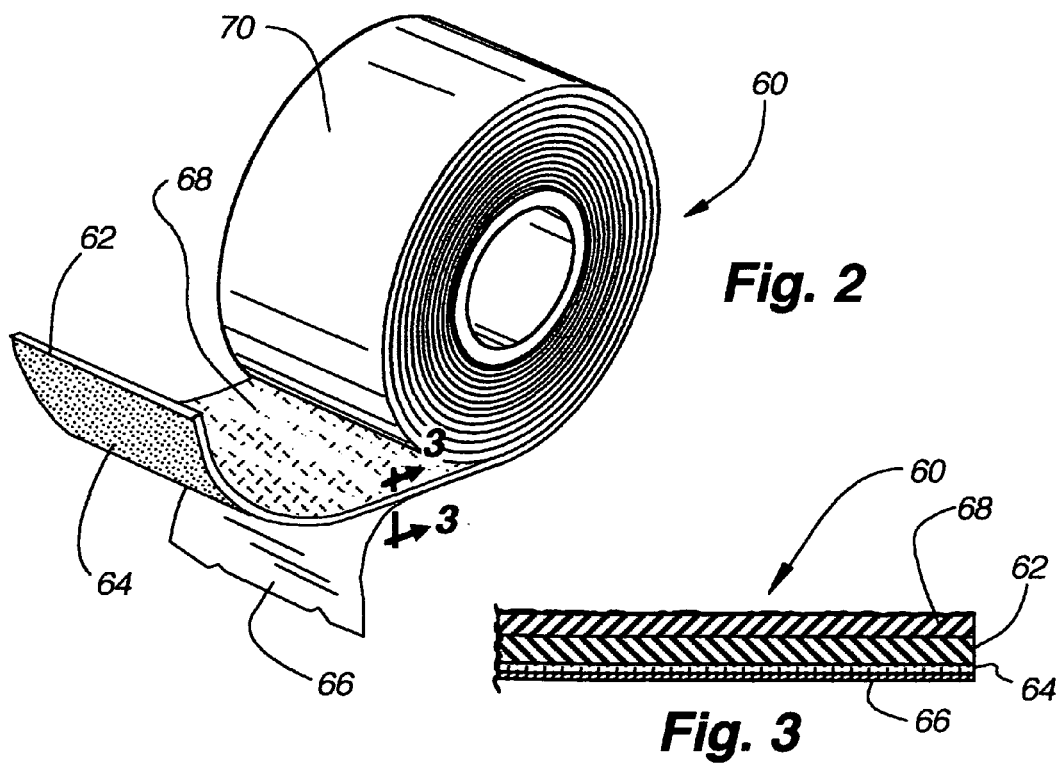
Fig. 2
Fig. 3

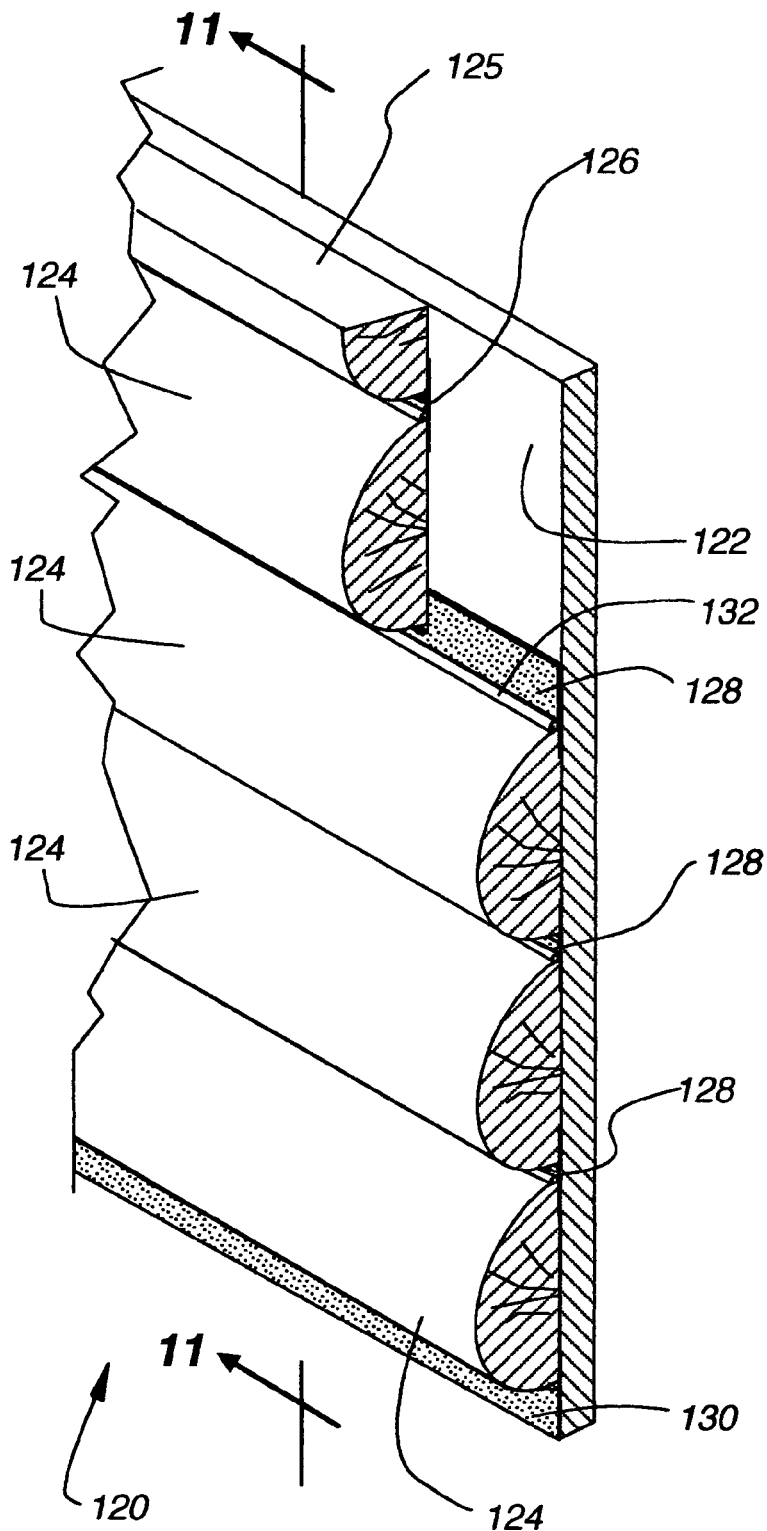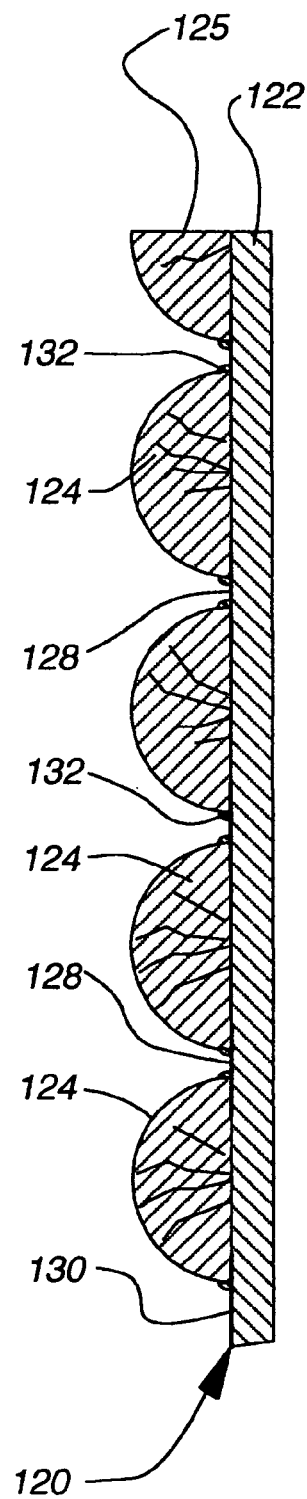
*Fig. 10*  *Fig. 11*

US 7,182,988 B2

CHINKING TAPE FOR LOG STRUCTURES

RELATED APPLICATIONS

This application is a continuation-in-part of U.S. patent application Ser. No. 09/971,235 filed Oct. 3, 2001 now U.S. Pat. No. 6,780,485.

BACKGROUND OF THE INVENTION

1. Field of the Invention

This invention is directed to a system for sealing the chink between logs in a log structure. It is more specifically directed to a flexible sealant strip and the composition for making the strip for use in sealing the space between adjacent logs in a log structure.

2. Discussion of the Background

The southeastern part of the United States was colonized many years before the northwestern part of the country. The climate was much milder in the southeast and our forefathers had time to try to maximize their techniques of log home building. One of the things that they learned was that the center or heartwood of the log was dryer and more bug resistant than the outer sapwood layers. In order to reap these advantages, they hewed large slabs from the logs which were often 8"×14" in size. These slabs were hewn from the center of the log. Double dovetailed joints were formed on the ends of the logs and the logs were stacked one on top of the other to form a wall for a log structure. This type of construction resulted in a southeastern regional style that has since become known as the Appalachian or Hearthstone Style.

Conversely, the climate in northwestern United States was much harsher and the early settlers were more interested in just getting the logs set in place so that they could have protection from the elements and the resulting style became the hand hewn, round on round style log structure.

Both styles normally had significant gaps or chinks between the logs and required some sort of chink filler to seal out the weather. The early chinking materials were normally clay, mud and straw or whatever was readily available. As log home structure development progressed, the chinking materials improved with the use of concrete, tar and even wooden wedges and splines. All of these chinking advances failed because the builders were still trying to seal a dynamic or continuously moving joint with a solid or non-flexible chinking material.

This problem became so well recognized by the log structure industry that by 1980 close to seventy percent (70%) of the log home companies in the United States and Canada were marketing various chinkless style homes. The chinkless style structure was created either by attempting to copy some of the old world scribe fit techniques or by trying to machine log mating surfaces with some sort of tongue and groove or spline joint that would keep out the elements. These attempts, though heavily marketed, were generally failures and by the 1980's various companies were attempting to develop an elastomeric chinking material to take its place. Most of the industry was still focusing on attempting to use concrete as the base material and achieve the desired elastic characteristics through the addition of various polymers. These prior art methods and materials also were destined for failure.

In the early 1980's the applicant developed the first all elastomeric chinking material for use in filling and sealing the chink or gaps between the logs in this type of structure. Various types of foam backer rods having various cross-sectional shapes were also used in filling the chink prior to applying the chinking sealant material.

Other attempts to close and seal the chink found between the surfaces of adjacent logs included installing elastomeric or resilient blocks between the logs at the time of construction with the blocks being somewhat compressed to adequately fill the void. In addition to the blocks, elongated splines fabricated from thin sheet material were installed longitudinally along each side of the blocks, usually within slots provided in the lower surface of the upper log and the upper surface of the lower log. These splines were arranged to fit within these slots to hold them in position and the splines were then nailed to the bottom log to rigidly attach the splines in place. A chinking sealant material could then be applied to the outside surface of the splines both on the inside and outside of the log structure to provide a finished appearance. This same type of construction was used in both the round on round type structure as well as the hewed slab type log structure.

In addition to these variations for sealing the chink, the splines were formed from waterproof or water resistant materials with the top and bottom joints or edges of the splines sealed by caulking. As it has been found over the years, these types of chinking materials and sealants did not prove to be permanent or completely adequate.

Recently, attempts have been made to pre-apply chinking sealant materials to the outer surface of the individual splines and the splines which were provided in fixed lengths were then delivered to the job site for installation. The problem with this type of construction was that the vertical joints between the adjacent splines, had an abutting joint which was difficult to seal to prevent the introduction of water and air which accelerated the deterioration of the joint which proved to be quite unsatisfactory.

The present invention is directed to a new and novel method to eliminate the problems which have been encountered in the past in trying to seal the chink between logs in log structures. It is an object of this invention to provide a low cost semi-flexible strip or tape sealant which can be easily applied in order to permanently seal the joint and prevent the introduction of the elements or contaminants. Another object of the present invention is to provide a relatively inexpensive sealant arrangement which can be easily applied by unskilled workers, including the home owner himself. A still further object of the present invention is to provide a chinking closure system which can be readily applied in various weather and temperature extremes and which has a generally long shelf life which allows it to be viable for a considerable length of time without deterioration, both before use as well as after.

3. Information Disclosure Statement The following statement is provided to comply with the applicant's acknowledged duty to inform the Patent and Trademark Office of any pertinent information of which he is aware. The following information refers to the most pertinent patents of which the applicant has knowledge with respect to the subject matter of the present invention. There is no intent to show that a comprehensive patentability search has been performed on the subject.

The Boucquey, et al patent (U.S. Pat. No. 4,185,428) discloses a device for sealing juxtaposed parallel logs separated by spacers. The spacers are intended to be narrower than the width of the log. The joint comprises a flat strip of resilient material having profiled flanges bent at about right angles with respect to the flat portion of the strip and adapted to be snapped in confronting longitudinal grooves made in the juxtaposed logs. An insulated sealing material is interposed between the strip and the spacer.

The Hauptman patent (U.S. Pat. No. 4,356,676) discloses a sealant strip which is provided having a soft, resilient synthetic foamed resin core. A pressure sensitive adhesive coating is applied on at least one of two of the opposed sides of the core and a thin, preferably silicone rubber sealing layer is cured in situ on the two remaining surfaces of the core. The strip is adapted for adhesive attachment to and compression between the log structural members with the core separating the edges of the sealing layers in contact with the opposed surfaces of the log structural elements. The strip is permanently positioned between the surface of the logs in order to seal the surfaces between the log structural members.

The Giles, et al patent (U.S. Pat. No. 4,918,888) discloses a chinking closure system comprising a compressible block which is inserted into a chink defined between adjacent log structural members. The block has a longitudinal axis which is substantially parallel with the longitudinal axis of each of the logs defining the chink. Elongated relatively rigid thin sheet splines are provided on each side of the block member and are inserted in grooves formed along the outer edges of the log structural members. These closure members or splines can be pre-coated with a textured finish to resemble mortar or the surfaces can be coated at the site. The closure members or splines can also be fabricated on a thin backing material and rolled for shipment to the construction site.

The Giles patent (U.S. Pat. No. 5,505,028) discloses the southeast style of log construction wherein the logs are formed by cutting longitudinal grooves in the upper and lower surfaces of the hewed logs with a corresponding spacer block disposed between the logs within the structure. In this way, the chink is filled by the spacer block to seal the void between the logs during the construction.

The Sharp patent (U.S. Pat. No. 5,787,661) discloses a simulated log structure providing a corner type assembly. The corners are positioned at the edges of the structure while a standard frame structure for the walls is provided. Simulated log strips or siding are positioned along the wall structure with simulated mortar strips provided between the siding sections. The mortar simulates the chinking material of a normal log structure. Vinyl siding can be used to simulate the logs themselves and mortar or gray tape can be provided between the siding strips to represent the chinking material.

The Davidson patent (U.S. Pat. No. 6,000,177) shows a simulated log structure similar to the Sharp patent wherein wood framing construction is used with a plurality of interlinking log ends forming the corner of the structure. Wall boards are attached horizontally to the construction frame and wood strips covered with a suitable surface material, such as paint, stucco or mesh material to simulate conventional chinking material are described.

The Foster patent (U.S. Pat. No. 4,822,655) shows a preformed sealant tape formed from butyl rubber which is essentially formed in three layers. The top layer is an abrasion resistant rubber membrane with a release paper forming the lower layer. Plasticized butyl rubber is positioned there between. The tape is unrolled as the release paper is removed. The butyl rubber has substantial adhesion and can be pressed into a joint to conform to the joint and to seal the joint against the introduction of moisture or other contaminants. This tape simulates liquid caulk for sealing openings or joints. There is no simulated masonry or chinking material pre-coating the tape to simulate conventional chinking materials.

SUMMARY OF THE INVENTION

The present invention is directed to the construction of log structures. Although the present invention can be applied to any style of log structure it is preferably intended for use with the southeastern style which is formed from slab logs which are actually hewn from a log forming a rectangular cross-section. These relatively narrow logs are then stacked one on top of the other with the ends crossed to form the corners.

In this type of structure, an elongated spacer block can be positioned between the logs to fill the chink or gap between the horizontal adjacent logs. In addition, it is also possible to include an elongated spline on each side of the spacer block with the splines inserted in grooves cut longitudinally along the upper and lower surfaces of the logs. It is possible to use the splines without a spacer block or spacer blocks without splines, but the use of the blocks provide a more stable and durable fill within the chink.

The present invention utilizes a flexible tape or strip which is pre-coated with a flexible chinking material which can be laid out and adhered to the side surface of the spacer block or the spline, whichever is exposed. Once the tape is applied using a pre-applied adhesive or a suitable attaching method, the upper and lower edges of the tape can be sealed by caulking to form a highly stable sealing closure.

The tape can be formed from either paper, woven fiberglass matting, thin plastic or metal sheeting, cotton or synthetic textile materials, burlap, or other flexible materials, such as random fiber sheets. This backing material is then coated with a synthetic resin composition, including a granular material, such as silicon sand, crushed rock, pumice, pearlite or other texturing media, to represent a mortar or cementations material. In this way, once the tape is applied to the chink, it will have the aesthetic appearance of conventional chinking material. Although acrylic resins, have been found to be highly suitable, it is possible to use any other synthetic resin or binder such as vinyl alkyd or phenolic resins, which will remain water impermeable and flexible under environmental conditions.

It is anticipated that the tape will be prefabricated into a wide strip during manufacture and then cut or slit into various widths, as desired, to meet the requirements for the various types of construction. Widths of 2½" and 4½" are anticipated to be the most desirable. However, any custom width that is required can be provided.

The present invention is novel and unobvious due to the fact that up until the present an easy and fast method of applying the chinking material has been unavailable. This has been primarily due to the type of materials that have been used in the past for this purpose and the skill required for their application. The present invention allows the chinking material to be preapplied to a backing material or backing strip and yet remain flexible enough to be rolled into an easily handled package. This tape is easy to install and can be conveniently applied by an unskilled worker or home owner, which eliminates the necessity for a professional applicator. In addition, by using this arrangement, the costs are greatly reduced both for the materials that are being used as well as the labor for their application. In addition, there is a benefit in that no messy tools or application procedures are required which greatly improves the efficiency of the application and operation.

With the sealant tape, which is the heart of the present invention, it is simple and easy to store and ship the material since there are minimal shelf life restrictions. This is also true with the application of the tape since the available temperature range is greatly expanded which allows an extended application season especially in the colder climates.

It has been found that the coating which is applied to the tape support member or backing is important to achieve the desired results. A compound including two parts silica sand and one part acrylic resin has been found to provide a flexibility and impermeability that is desirable. The following composition has been found to be suitable for the intended purpose. These percentages are by weight of the composition.

| | |
|---|---|
| Silica Sand | 40–75% |
| Acrylic Resin | 10–55% |
| Zinc Sulfide | 0.5–5% |
| Titanium Dioxide | 0.3–5% |
| Fiber | 0–10% |
| Ammonium Hydroxide | 0–5% |
| Polyurethane Resin | 0–10% |
| Acrylic Copolymer | 0–10% |
| Aliphatic Solvents | 0–5% |
| Fungicide & Bactericide | 0–5% |

The extended use of this compound under simulated environmental conditions shows that the coating remains impermeable to moisture and the elements and yet remains flexible to absorb movements between the logs to maintain a permanent seal of the chink.

Other objects and benefits can be ascertained concerning this invention through the explanation that is provided and the drawings which accompany this application.

BRIEF DESCRIPTION OF THE DRAWINGS

FIG. 1 shows a perspective view of a log structure using the chinking tape according to the present invention;

FIG. 2 is a perspective view of a roll of chinking tape detailing its fabrication;

FIG. 3 is a cross-sectional view of the tape showing its layered construction;

FIG. 10 is a perspective view of a simulated log construction panel showing the textured tape of the present invention positioned between the spaced simulated logs; and FIG. 11 is a cross-sectional view taken along lines 11—11 of FIG. 10.

DETAILED DESCRIPTION OF THE INVENTION

Figure 4:
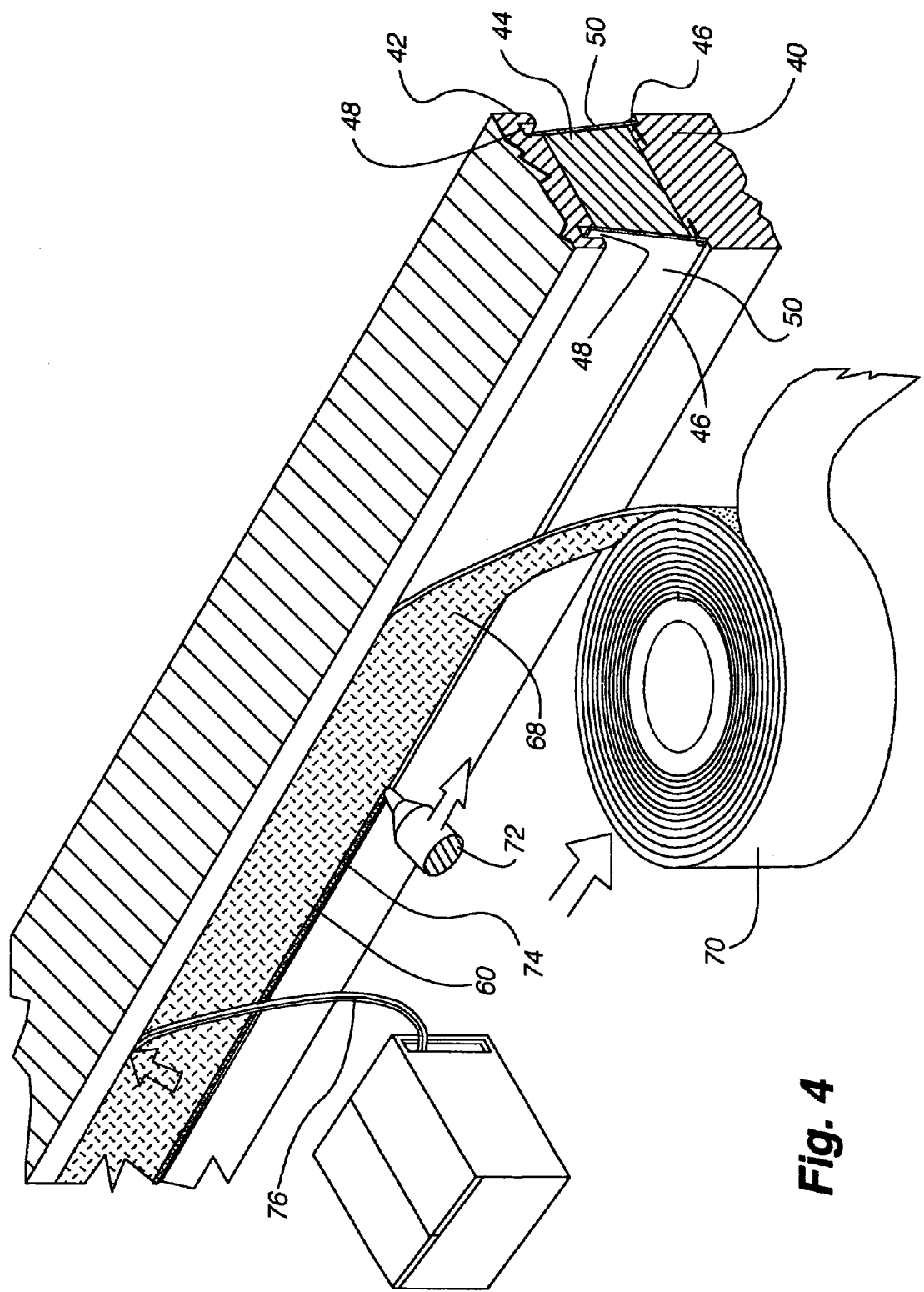
FIG. 4 is a pictorial perspective view showing the installation of the chinking tape applied to splines positioned within the chink.

Turning now to the drawings, FIG. 1 shows a log structure, such as a home 10 having a front wall 12, side walls 14, 16 and rear wall 18. Roof 20 is provided to enclose the structure 10 and to make it inhabitable. A chimney 22 along with windows 24, 26, door 28 and porch 30 can also be provided. Individual logs 32 are used in forming the front wall 12, rear wall 18 and side walls 14, 16. These logs are stacked on top of each other in a horizontal position with the corners overlapping, usually with a dovetail configuration so that the logs will interfit and lock into position. A gap or space called a chink 34 is found between the adjacent logs. It is necessary to seal the chink to prevent the passage of air, contaminants and weather elements and to seal the structure to make it livable and comfortable.

It is to be understood that the present invention can apply to any type of log structure whether it uses round logs, or sawed or hewed logs which usually have a rectangular cross-section. The difference is immaterial in that the intent is to seal the chink between these adjacent logs. The present invention can be used with any of these types of structures, as well as imitation log panels and structures.

Figure 5:
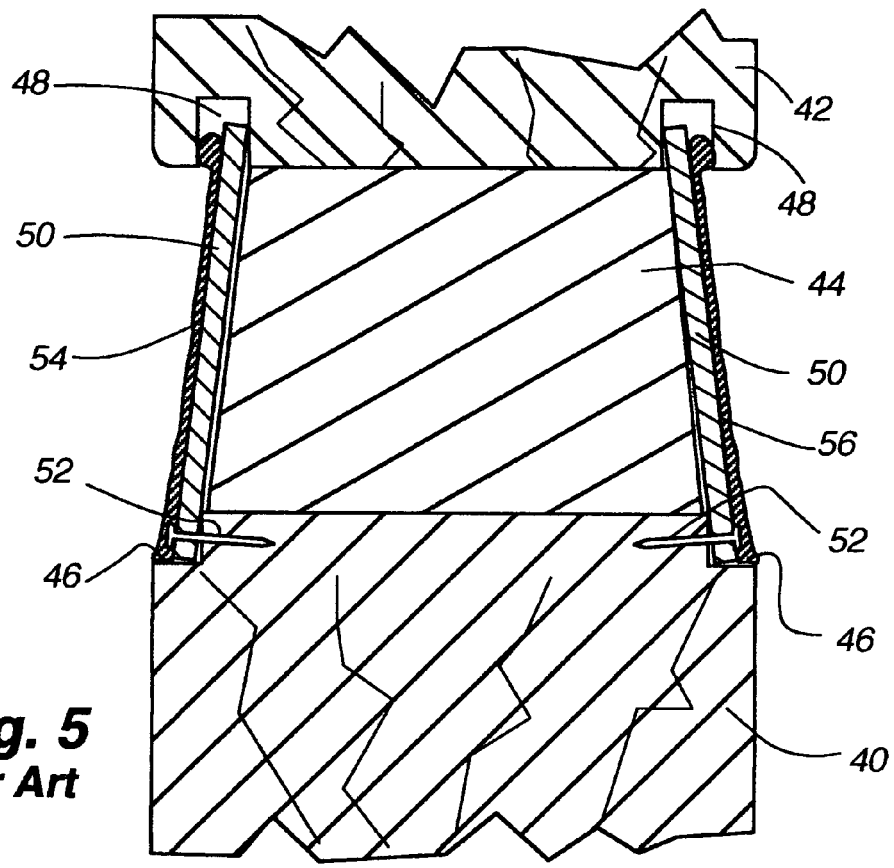
FIG. 5 is a partial cross-sectional view through the chink in a log structure showing a prior art closure system.

For the purpose of illustration, we will use the southeastern or Appalachian style log structure which is essentially shown in FIG. 5 as the prior art. In this illustration, the lower log 40 and upper log 42 are positioned in a stacked formation with a spacer block 44 positioned there between. The elongated spacer block 44 is intended to fill the space or chink found when stacking the logs 40, 42 in position. This area can have various dimensional heights which can range from 2½" to possibly 6½" depending upon the type of structure that is being constructed. In addition, usually notches 46 are provided along the corner edges of the lower log 40 while elongated slots 48 can be formed in the lower surface of the upper log 42.

These notches and slots extend longitudinally along the logs near these outer edges and are used for recesses for installing and retaining a spline 50 in position on each side of the chink. The splines can be formed from any type of relatively rigid, thin flat material that can be cut into strips and inserted into the upper groove 48 and fastened into position, such as by nails 52 at the lower edge. Plywood or Masonite can be used for the splines 50 and have proven to be quite satisfactory for this purpose. It is also understood that any type of fastener can be substituted for the nails, such as screws, dowels or pins.

The outside surface of the spline is covered with a conventional chinking sealant 54, such as cement, plaster, grout or any other suitable coating which can be applied so as to seal the spline and the chink against the weather elements or contamination. Extra amounts of the chinking material 54 can be inserted into the groove 48 to seal the upper edge of the spline. This material can also be applied in the notches 46 to seal the lower edge. In addition to this, caulk may also be applied in these areas in order to provide a better seal against the elements.

The chinking material that is used in this type of log structure construction can have a different consistency when the chinking material 56 is applied to the interior surface of the log structure. In other words, a different color or a different texture can be used in the chinking material 56 to provide a more pleasing and aesthetic appearance to the inside wall.

These types of chinking materials which are usually, but not always, used in conjunction with splines, have been found to be unsatisfactory from the standpoint that the chinking material is firmly bonded to the outer edge of the upper log 42 outer skirt and to the spline 50. When the logs shrink and the outer skirt moves (often as much as ⅜ inch) all the stretch is isolated to the space between the outer skirt and the spline 50 (often no more then ⅛ inch). This exceeds the elastic limits of normal chinking, eventually allowing the introduction of moisture, and in some cases air to pass through the chink to the interior of the structure. Thus, the ability to seal the chink is a constant effort. This makes it necessary for the builder or the owner of the structure to constantly seal and caulk the joints used in the chink, to allow the structure to continue to be inhabitable and acceptable.

The applicant has found that it is necessary to provide a flexible chink closure, one that will still have the appearance of the prior art chinking material, but will still be flexible and easily installed. To accomplish this, a pre-textured tape 60 for sealing the chink has been found to be capable of sealing the chink and yet inexpensive and easily installed. The tape 60 has a support member or layer which is formed from material 62 to which a suitable attaching device or adhesive 64 can be applied. A release paper or protective layer 66 can be applied to cover and protect the adhesive, if used. The release paper will be removed at the time that the tape is installed.

For the purpose intended, the adhesive 64 can be any type, such as a contact adhesive or a solvent or heat activated adhesive which can be activated at the time that the tape is installed. It is also possible that the tape would not have the adhesive applied during manufacture, but the adhesive would be applied directly to the objects positioned in the chink and the tape applied over the separate adhesive. It is usually necessary to apply an adhesive which remains pliable and usable through a fairly wide range of temperatures, such as 40° to as high as 110° which would be the common range anticipated during log home construction.

The backing material or support member 62 can be provided from paper, plastic or metal sheet material or woven type materials. In addition, the material can be burlap, woven fiberglass, or a common textile material, such as cotton, nylon, rayon or the like. Even a random fiber sheet material can be used for the support member. The outer pre-textured coating 68 needs to also be flexible and can be a synthetic resin impregnated or mixed with silica sand or other granular texturing materials, such as crushed rock, pumice, pearlite or the like, so that the coating will resemble mortar or grout. The synthetic resins can include acrylic, vinyl, alkyd and phenolic resins. Polyurethane resin as well as acrylic co-polymers can be used as plasticizers in the coating to keep the material flexible under variable temperature conditions. Titanium dioxide and other pigments can also be added to provide coloring for the texture of coating material. In addition to these, bactericides and fungicides can also be added to maintain the appearance of the texture while in use over a long period of time. Other solvents and material can be added as necessary to maintain various characteristics that are desirable in this type of material.

A continuous manufacturing process can be utilized to fabricate the tape 60. Thus, the backing or support material 62 can be unrolled from a roll or spool while an adhesive 64 is applied to one surface of the backing material along with the release layer or paper 66 which can be added during this process. At the same time that the adhesive 64 and release paper 66 are applied, the pre-textured coating material 68 can be applied to the opposite surface. It is to be understood that the granular material does not have to be mixed in the synthetic resin coating but can be adhered to the outer surface of the coating and still provide the desired cementitious or grout appearance.

The completed tape can then be rolled as shown in FIG. 2 into a suitable package 70 for transportation and storage. During the manufacturing the tape can be formed in any width desired with the completed material then cut or slit either at the time of manufacture or afterwards into various widths which are required for various types of log structures. These widths are anticipated to be approximately 2½" and possible 4½" which are normal for the Appalachian or southeastern style log structure. It is also understood that any width desired for the various styles of log construction can be provided. These elongated strips are then individually rolled, as required, into convenient packages that are easily handled on the job site.

As shown in FIG. 4, a log structure has an upper log 42 and the lower log 40 having a spacer block 44 positioned between the logs. Longitudinal grooves 48 are cut near the outer edges of the upper log 42 and notches 46 are formed in the upper edges of the lower log 40. These grooves and notches are used to position splines 50 on each side of the spacer block 44. With this structure in position, the chinking tape, which is the subject of the present invention, can be unrolled from the supply roll 70 with the release paper 66 peeled back as the tape is applied to the outer surface of the spline 50. Because of the fact that the tape is in a relatively large roll, the tape is continuous from one end of the log to the other. As a result, no joints or splices are usually necessary through which moisture and contamination can enter. If a joint or splice is required during the application, the joint can be overlapped and/or caulked and the texture brushed on. In this way, a weather tight joint or seal can be obtained.

The width of the tape is sized to cover the exposed surface of the spline 50 from the lower notch 46 to or into the groove 48. Even if the tape does not enter the groove 48, it can still be sealed by applying a foam, rubber, neoprene, or plastic weather strip 76 into the groove so as to fill the void in this area and to seal the tape as well as the spline to the lower edge of the upper log 42. The lower edge of the tape is then sealed by means of a caulking gun 72 applying a bead of caulk 74 along the lower edge so as to seal the tape against the surface of the log. The upper edge of the tape can also be sealed by caulk, if desired.

Since the texture material 68 on the tape on the outer surface of the wall is a moisture impermeable material, the chink is completely sealed against the elements to inhibit the introduction of moisture, air or other contaminants through the log joint and into the interior of the structure.

In the same way that is illustrated in FIG. 4, the tape 60 can be installed on the chink areas on the inside surface of the wall. The same tape 60 or a tape having a different surface texture can be applied to the splines on the inside surface of the wall, if desired. It is intended that the textured material used on the tape will provide an aesthetically pleasing appearance to the finished interior surface of the wall. It is also possible to add designs and/or small objects in the textured surface of the tape to add a decorative appearance to the finished interior or exterior wall surface.

Figure 6:
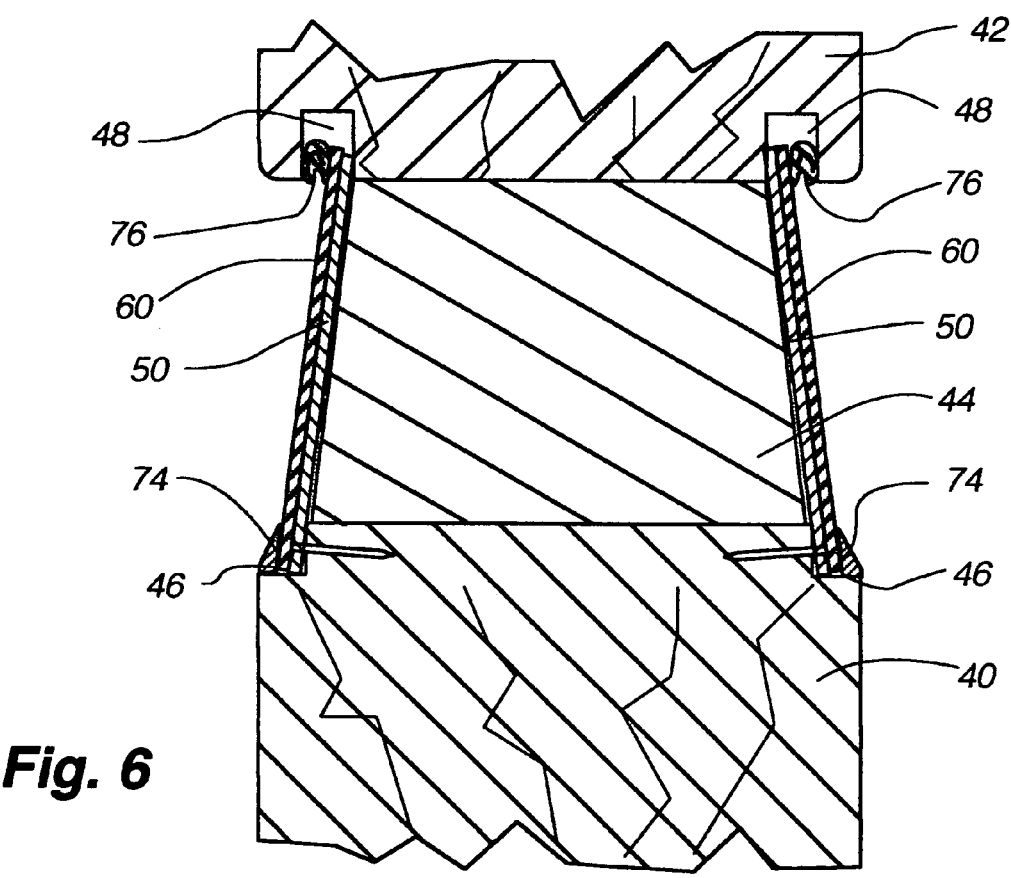
FIG. 6 is a partial cross-sectional view of a chink showing the application of the chinking tape according to the present invention.

FIG. 6 is a partial cross-section of the structure which is shown in FIG. 4 with the application of the chinking tape according to the present invention.

Figure 7:
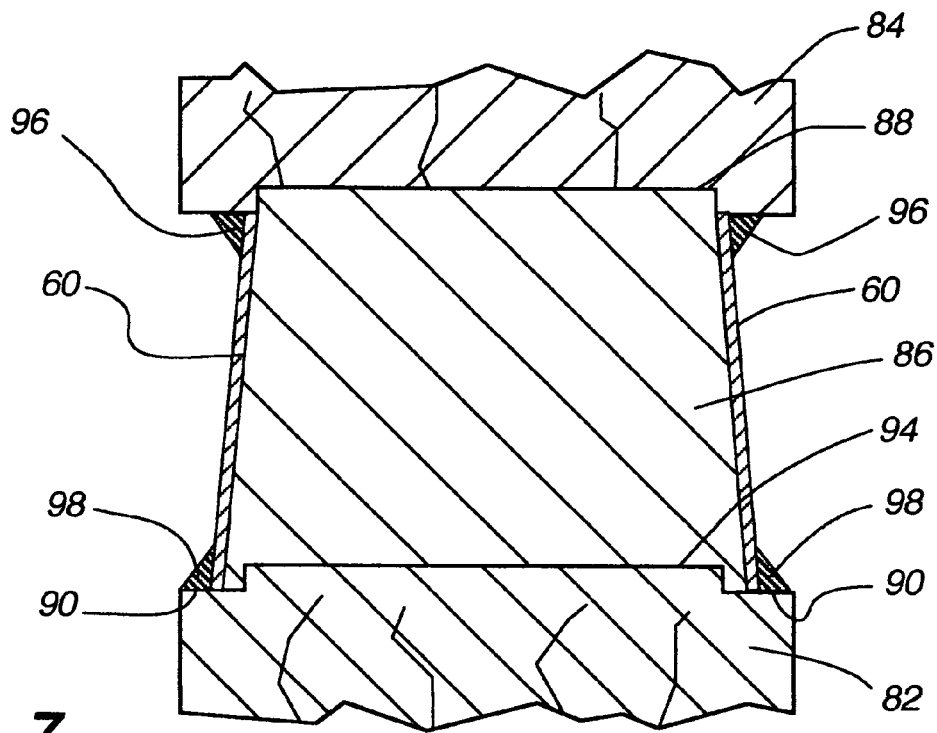
FIG. 7 is a cross-sectional view showing the textured tape applied directly to a spacer block.

In FIG. 7 is shown another embodiment of the present invention wherein the lower log 82 and the upper log 84 have a spacer block 86 positioned therebetween. A relatively wide groove 88 is cut into the bottom or lower surface of the log 84 and is sized to fit the upper edge of the spacer block 86. In the same way, the outer edges of the top, or upper surface of the lower log 82 is formed with notches 90 on each side. The bottom surface of the spacer block 86 can be undercut 94 with a router or dado saw-blade to closely fit the upper surface of the log 82. The pre-textured chinking tape 60 according to the present invention, is then applied directly to both sides of the spacer block, as shown in FIG. 7. The upper and lower edges of the taped sections are sealed by a caulk bead 96, 98. In this embodiment, the pre-textured chinking tape is applied to the sides of the spacer block in order to seal the block as well as the chink.

Figure 8:
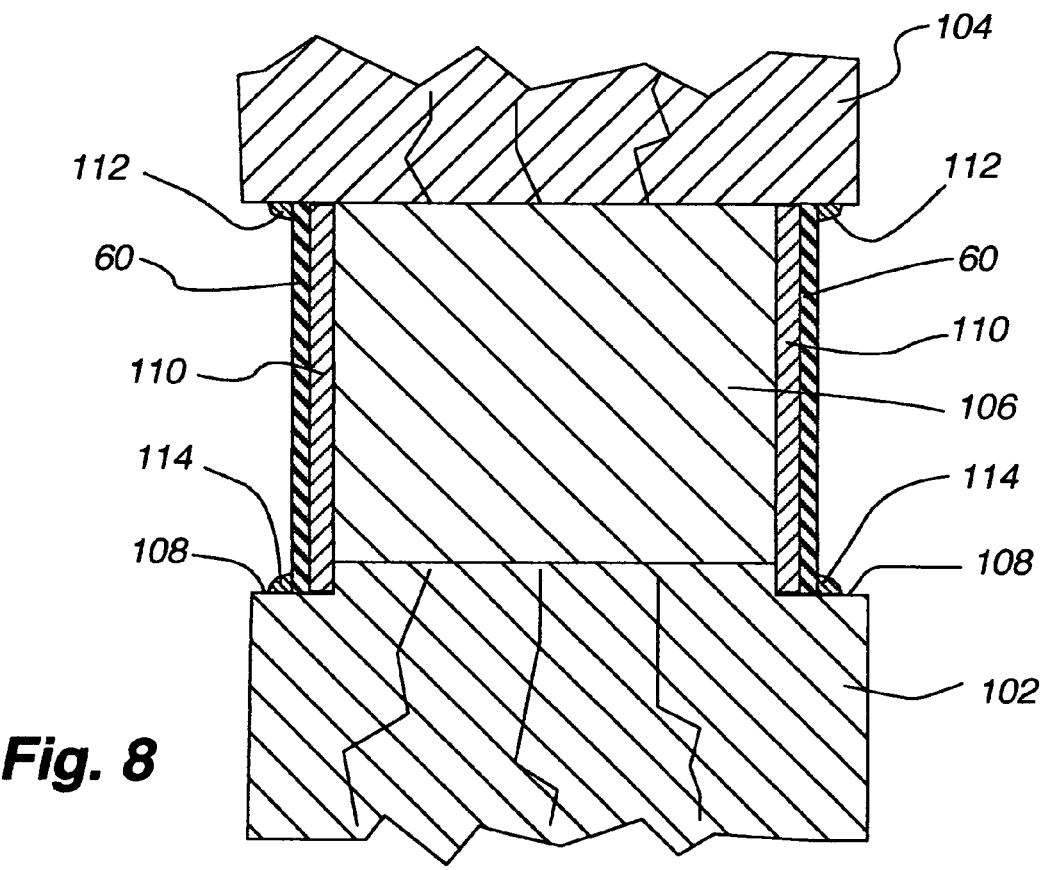
FIG. 8 is a partial cross-sectional view showing the textured tape applied to an insulation board spline provided within the chink.

In FIG. 8 is shown another embodiment of the present invention wherein the lower log 102 and upper log 104 are positioned with a spacer block 106 positioned therebetween. Although the bottom surface of the upper log 104 and the top surface of the lower log 102 can be flat, it is possible to cut notches 108 in the outer edges of the top surface of the bottom log 102, as shown in the illustration. The bottom outer edges of the upper log 104 can also have this configuration. An insulation sheet or board 110 can be provided on one or both sides of the spacer block 106 and cut to fit the space between the upper and lower logs. The pre-textured tape 60, according to the present invention, can be applied to the outer surface of the insulation board 110 to seal the insulation board as well as the spacer block 106 and the edge surfaces of the logs 102, 104. Caulk beads 112, 114 can be applied to the upper and lower edges of the tape to seal these edges against the respective logs. In this way, the chink can be permanently sealed to prevent the passage and inclusion of moisture, wind or the elements from penetrating the joint between the logs.

Figure 9:
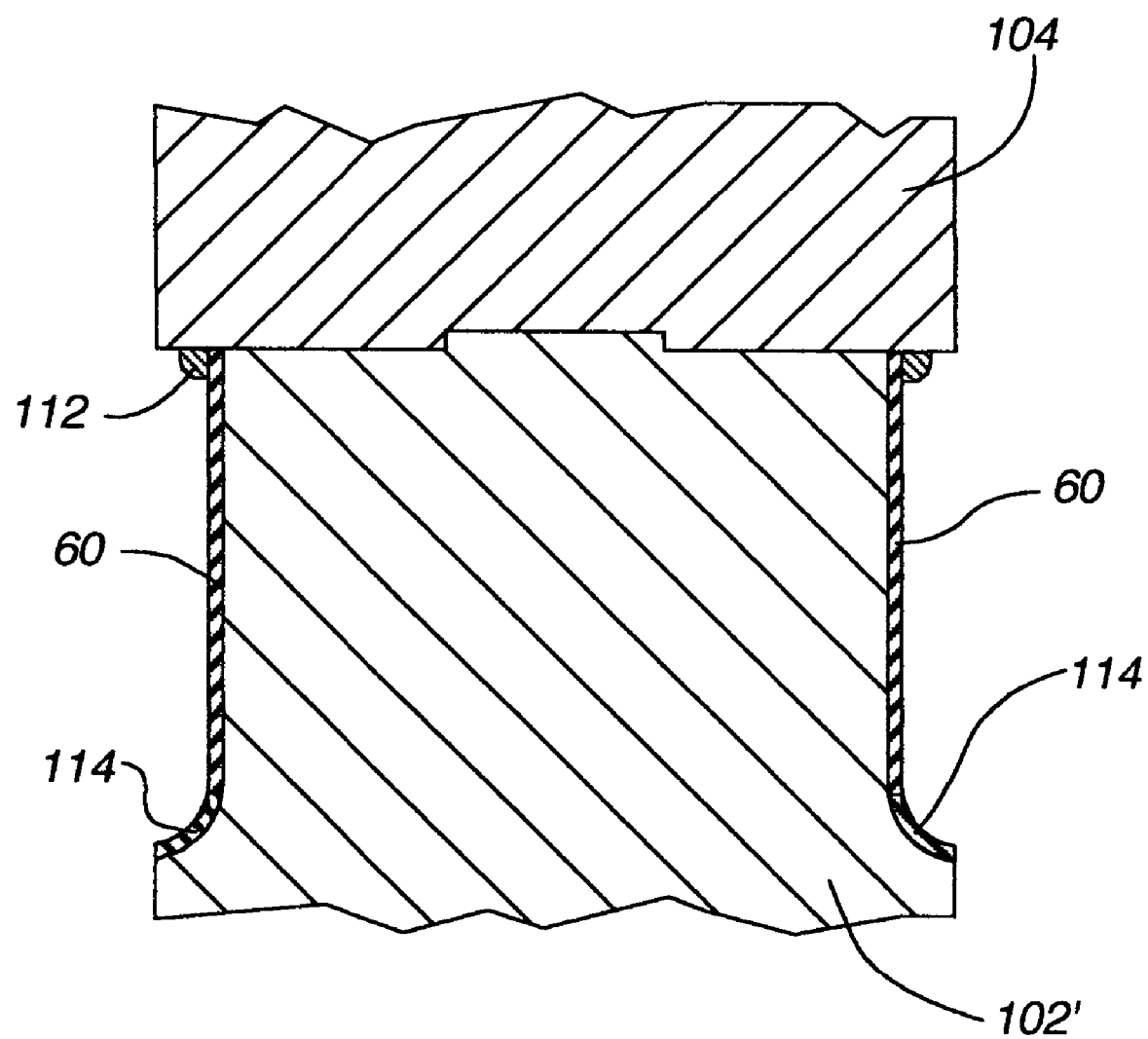
FIG. 9 is a partial cross-sectional view showing the textured tape applied directly to the edges of one log.

It is to be understood that the pre-textured chinking tape of the present invention can be applied directly to the splines, to the spacer block or directly to the surfaces of the logs themselves (see FIG. 9). The latter is primarily intended for aesthetic appearance by providing a chinking material between the juxtapositioned logs. In this way, a simulated chinking can be incorporated while it seals the contact area between the logs.

FIGS. 10 and 11 show another use of the pre-textured chinking tape 60 for use in the manufacturing of simulated log panels 120. The panels 120 can be used in the construction of homes or buildings when the structure is preformed with the standard frame type construction. The panels then are mounted on the surfaces of the framed structure and finished to provide the appearance of log construction.

The simulated log panels 120 are formed from a sheet of plywood or other similar type material which has sufficient thickness to maintain the rigidity of the completed panel. The logs 124 are log slabs or half logs which are usually formed from the heartwood of the log. The logs are positioned longitudinally and parallel on the plywood backing sheet 122 and are arranged to have a space 126 between the adjacent logs. The space 126 resembles the chink that is common between logs in this type of structure. As the panel 122 is built up the first log 124 is positioned on the panel and a strip of pre-textured chinking tape 128 according to the present invention is applied to the surface of the plywood backing sheet 122 so that the edge of the tape is overlapped by the edge of the log 124. The next, adjacent log 124 is then mounted on the plywood backing sheet with its adjacent edge is also overlapping the edge of the chinking tape 128. The panel then is formed by adding additional strips of tape 128 and logs 124 to completely cover the plywood backing sheet 122. Where necessary, a quarter log 125 can be positioned along one longitudinal edge of the plywood backing sheet to form an invisible joint with the next adjacent simulated log panel. If desired, the quarter log 125 can be omitted and the longitudinal edges of the panel 120 can be finished with an overhang lip 130 that has a width which is one-half of the normal spacing 126 between the adjacent logs. This lip can be covered by the chinking tape wherein the edge of the tape is applied flush with the edge of the plywood backing sheet 122.

In this configuration the edges of the tape are overlapped by the half logs 124 which helps to seal the edges of the tape. In addition a bead of caulk 132 can be applied between the surface of the tape and longitudinally along the edge of the logs 124 to seal the tape and logs from moisture or the accumulation of debris. In this way the outer surface of the plywood backing sheet 122 is permanently sealed against the environment.

Throughout this application there has been reference to a chinking material that can be used in the texturing or coating of the chinking tape. The applicant has found that a texture composition made up of the following elements given in percentage by weight has proven to be a satisfactory example for the intended purpose; silica sand 63.65%; acrylic resin 31.83%; zinc sulfite 1.27%; titanium dioxide 1.27%; fiber (binder) 0.64%; ammonium hydroxide 0.45%; polyurethane resin 0.32%; acrylic co-polymer 0.22%; aliphatic solvent 0.14%; and bactericide and fungicide 0.14%. This composition is thoroughly mixed into a viscous form that can be easily coated and spread on the backing material 62. A relatively thin coating of the texture composition is applied to the backing material to a thickness of approximately 1/16". This compares to the depth of approximately 1/4 to which the conventional type of chinking materials are directly applied to the chink area. It is submitted that this thickness of the texture on the tape is quite adequate to provide a flexible, impermeable moisture barrier as well as a sealant against contaminants. It is to be understood that the present invention is not to be limited by the thickness of the coating. The thickness can be varied to accommodate the structure conditions that are anticipated.

The thickness of the coating on the support backing and its flexibility allows the material to be formed into the rolled configuration which is helpful in the application process as well as the transportation and storage of the product.

It is well known that any other suitable chinking material can be applied to the tape which is provided in the present invention so long as the material is both impermeable as well as flexible so as to be easily handled and formed in the rolled configuration. The use of synthetic resins for the coating of the tape has maintained the desired flexibility characteristics of the finished product.

In view of the description which is provided herein, it can be easily seen that the present invention provides a chinking tape for use in the construction of log structures. This tape has considerable advantages over the prior art methods of sealing the chink through the use of various closure arrangements using chinking sealant materials.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

What is claimed is:

1. A narrow flexible chink sealant strip for sealing in combination a chink between adjacent logs of a log structure, said combination comprising the chink between adjacent logs of a log structure containing objects positioned in said chink and the strip which includes:

a) an elongated thin flexible material forming a support member having two opposite surfaces and said support member has a width of a predetermined dimension which fits the chink between the adjacent logs of the log structure;
b) a flexible coating applied to one surface of the support member to seal and render the member impermeable to contaminants, said flexible coating is formed from a synthetic resin and a granular material so that the coating has the appearance of conventional chinking material; and
c) an attaching means applied to the opposite surface of the support member from said coated surface attaches the support member to objects positioned in the chink whereby the chink between adjacent logs is substantially sealed, wherein said strip is attached to the objects positioned in the chink so as to seal the joint between the logs preventing the passage of contaminants.

2. The combination as defined in claim 1 wherein said attaching means is a suitable adhesive which is applied to the surface of said support member for permanently attaching the sealant strip to seal said chink.

3. The combination as defined in claim 1 wherein the flexible material making up the support member is a woven material.

4. The combination as defined in claim 3 wherein the woven material is formed from fiberglass.

5. The combination as defined in claim 1 wherein the attaching means is a contact adhesive for attaching the sealant strip to objects positioned within the chink.

6. The combination as defined in claim 5 wherein the strip includes a release sheet having the same width as the support member and arranged to cover the contact adhesive prior to use.

7. The combination as defined in claim 6 wherein the sealant strip is rolled into a roll configuration to make the sealant strip easier to store and handle prior to use.

8. The combination as described in claim 1 wherein the strip is formed in a roll having an extended length and the strip is adhered to the objects positioned within said chink as a continuous strip.

9. A narrow flexible chink tape for sealing in combination with a chink between logs in a log structure, said combination comprising the chink between adjacent logs of a log structure containing objects positioned in said chink and the strip which includes:
a) thin flexible material formed in an elongated strip, said strip having a predetermined width being sized to fit the chink between the logs of the structure, said strip having two opposing surfaces;
b) a flexible coating applied to one surface of the strip to make the strip impermeable to contaminants, said flexible coating is formed from a synthetic resin and a granular material so that the coating has the appearance of conventional chinking material; and
c) an attaching means applied to the opposite surface of the strip attaches the tape to the chink between the logs to seal the chink against the passage of contaminants, wherein said tape is attached to the objects positioned in the chink between the adjacent logs and is impermeable to prevent the passage of contaminants between said logs.

10. The combination as defined in claim 9 wherein the flexible strip material is a woven material.

11. The combination as defined in claim 9 wherein the flexible strip material is a random fiber sheet material.

12. The combination as defined in claim 9 wherein the flexible coating applied to one surface is a sand impregnated acrylic resin composition which remains flexible and impermeable during use.

13. The combination as defined in claim 9 wherein the flexible coating composition has an approximate proportion of granular material to synthetic resin of 2:1.

14. The combination as defined in claim 9 wherein the attaching means is an adhesive which is applied to the opposite side of the elongated strip from said flexible coating and is used to directly attach the sealing tape to the chink between adjacent logs of a log structure.

15. The combination as defined in claim 14 wherein the adhesive is a contact adhesive which has its outer surface covered by a release sheet to protect the adhesive surface prior to use.

16. The combination as defined in claim 9 wherein one of the adjacent logs extends into and substantially fills the chink between the adjacent log, and the flexible tape is applied directly to the log and the adjacent log sealing the chink between the logs.

17. A narrow flexible tape for sealing a chink between logs in a log structure, said tape being impermeable to prevent the passage of contaminants between the logs, the tape comprising:
a) thin flexible material formed in an elongated strip, said strip having a width which is sized to fit the chink between the logs of the structure, said strip having two opposing surfaces;
b) a flexible coating applied to one surface of the strip to make the strip impermeable to contaminants, said flexible coating being formed from a synthetic resin and a granular material so that the coating has the appearance of conventional chinking material;
c) an attaching means to attach the tape to the chink between the logs to seal the chink against the passage of contaminants; and
d) said flexible coating is a composition consisting of the following percentages by weight of the total composition;

| | |
|---|---|
| Granular Materials | 40–75% |
| Synthetic Resin | 10–55% |
| Zinc Sulfide | 0.5–5% |
| Titanium Dioxide | 0.3–5% |
| Fiber | 0–10% |
| Ammonium Hydroxide | 0–5% |
| Polyurethane Resin | 0–10% |
| Acrylic Copolymer | 0–10% |
| Aliphatic Solvents | 0–5% |
| Fungicide & Bactericide | 0–5% |

18. A narrow flexible chink tape for sealing in combination a chink between logs in a log structure, the combination comprising the chink between adjacent logs of a log structure containing objects positioned in said chink and the strip which includes:
a) thin flexible material formed in an elongated strip, said strip having a width which is sized to fit the chink between the logs of the structure, said strip having two opposing surfaces;
b) a flexible coating applied to one surface of the strip to make the strip impermeable to contaminants, said flexible coating is formed from a synthetic resin and a granular material so that the coating has the appearance of conventional chinking material;

c) an attaching means attaches the tape to the chink between the logs to seal the chink against the passage of contaminants wherein said strip is attached to the objects in the chink so as to seal the joint between the logs preventing the passage of the contaminants; and
d) said flexible coating is a composition consisting of the following percentages by weight of the total composition;

| | |
|---|---|
| Granular Materials | 40–75% |
| Synthetic Resin | 10–55% |

-continued

| | |
|---|---|
| Zinc Sulfide | 0.5–5% |
| Titanium Dioxide | 0.3–5% |
| Fiber | 0–10% |
| Ammonium Hydroxide | 0–5% |
| Polyurethane Resin | 0–10% |
| Acrylic Copolymer | 0–10% |
| Aliphatic Solvents | 0–5% |
| Fungicide & Bactericide | 0–5% |

* * * * *